July 6, 1937. E. P. GRAY 2,085,907
MULTIPLE BUSHING
Filed July 20, 1936

INVENTOR
Emmet P. Gray,
BY Minturn Minturn
ATTORNEYS

Patented July 6, 1937

2,085,907

UNITED STATES PATENT OFFICE 2,085,907

MULTIPLE BUSHING

Emmet P. Gray, Detroit, Mich., assignor to Basca Manufacturing Company, Inc., Indianapolis, Ind.

Application July 20, 1936, Serial No. 91,538

3 Claims. (Cl. 285—183)

This invention relates to means for providing a coupling between cylindrical members of different sizes, such for example, as a pipe or shaft of one diameter being carried into a pipe or fitting of a larger diameter. A primary object of the invention is to provide a bushing which may be utilized to take up the differences in diameters of such members as above indicated, the bushing having such a structure as will permit it to be readily contracted snugly around the inner member. A further primary object of the invention is to provide sealing means incorporated in the bushing to prevent leakage between the two members being bushed. To this end my invention comprises one or more metallic bushings cut through thereacross to permit contraction of the bushing and being provided with circumferential slots rather than slots in alignment with the bushing axis whereby a bushing of sufficient length may be employed for stability but limited as to its metal face in order to permit easy flexing of the bushing circumferentially and at the same time to permit the forming of a plurality of sealing edges.

Figure 1:
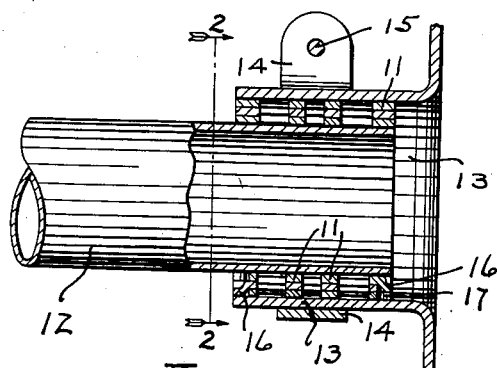
Figure 2:
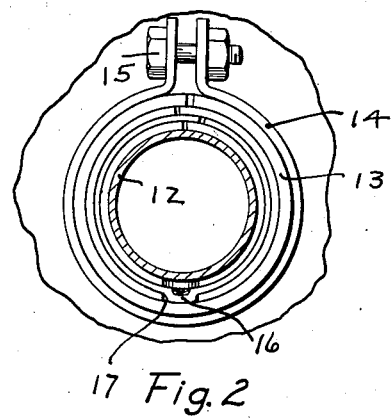
Figure 3:
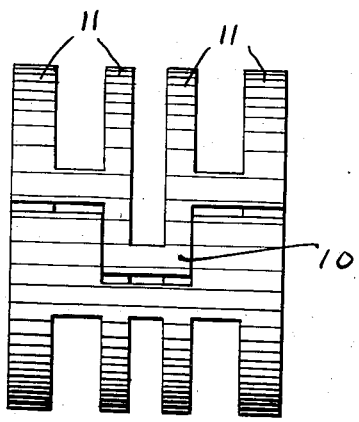
Figure 4:
Figure 5:
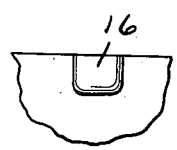

These and other objects and advantages of the invention will become more apparent to those versed in the art in the following description of one particular form of my invention as illustrated in the accompanying drawing, in which Fig. 1 is a central longitudinal section through a bushed connection embodying my invention;

Fig. 2, a transverse section on the line 2—2 in Fig. 1;

Fig. 3, a side elevation of the bushing,

Fig. 4, a detail in section of a bushing aligning member;

Fig. 5, a detail in side elevation of the member; and

Figure 6:
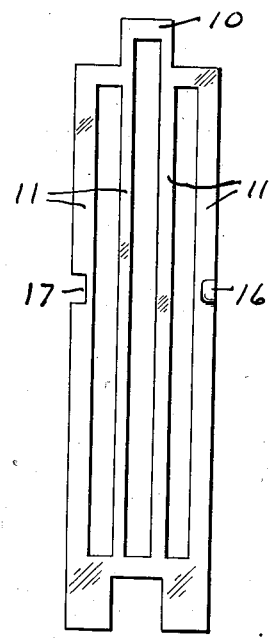

Fig. 6, a developed plan view of the bushing before being formed into a cylinder.

Like characters of reference indicate like parts in the several views in the drawing.

Referring first to Fig. 3, I form a band of metal into a cylindrical form to have its ends come together in a stepped joint similar to that heretofore employed in piston rings and the like, the step however being double in comparison to the single step of such rings. This step joint is formed by a tongue 10 extending from one end of the metal into a central cut-out portion of like configuration in the other end, the ends being brought toward one another and normally terminating with a circumferential clearance therebetween. The bushing is cut away to leave in effect a plurality of rings 11 spaced apart laterally one from the other and joined together only by their ends in the respective ends of the bushing.

Assuming for example that the pipe 12 is to be fitted into the member 13 having an internal diameter greater than the external diameter of the pipe 12, one or more of these bushings above described are placed over the end of the pipe 12 as may be required to fill in the space between the pipe and the fitting 13. Where more than one bushing is required in this respect, a plurality of bushings may be made up one to nest inside of the other. In placing the bushings within the member 13, the bushings are so selected as to their normal diameters as will cause the ends to be brought around toward a closed position. In order to bring the bushings into a final gripping and sealing position, a clamp of some nature here shown as a strap 14, is employed to surround the fitting 13 and is drawn up circumferentially therearound by means of a bolt 15. Of course employing such a clamp, the member 13 would be split in order to permit the clamp 14 to be pulled down to a smaller diameter and thereby bring a squeezing action on the bushings therein tending to reduce their diameters correspondingly and thereby in turn grip the end of the pipe 12.

Since the bushing in each instance is reduced in effect to a plurality of individual bands 11 rather than being a continuous width of metal, these bushings may be very effectively drawn up by the bolt 15. Moreover since there are a plurality of chambers formed between the bands 11 making up the bushings, there is in effect produced a labyrinth packing which is particularly effective where the pipe 12 constitutes an exhaust pipe from a gas engine and the member 13 is a flange or fitting on the head of a muffler. In this instance, the bushings will form a packing to prevent the escape of exhaust gases as well as a bushing to take up the difference between the diameters of the respective members.

In some cases it may be desirable to provide means to prevent the longitudinal displacement of the bushings particularly while they are being assembled in the member 13. In this regard each bushing may be punched at its outer edge to form a cup-like button 16 and a corresponding sized slot may be cut out of the opposite side in alignment therewith. Therefore in making up a nest of such bushings, the button 16 of one bushing may engage within the slot 17 of the outer bushing.

While I have herein shown and described my invention in the one best form as now known to me, it is obvious that structural variations may be employed without departing from the spirit of the invention and I, therefore, do not desire to be limited to that precise form beyond the limitations as may be imposed by the following claims.

I claim:

1. A bushing comprising a length of flexible tubular metal, split longitudinally to permit circumferential contraction, and having slots cut through and around the major circumferential length thereof leaving in effect a plurality of bands of metal united across the ends of the slots.

2. In combination with a fitting having an internal bore and a member having a diameter less than said bore, means for bushing up said member and forming a seal between it and said bore, comprising a plurality of bands of flexible metal, transverse pieces uniting the respective ends of the bands and spacing the bands apart one from another, said bands and said pieces being proportioned so that said pieces may be sprung toward each other from a normal spaced apart position, said bands being placed over said member and inserted within said bore, and means for contracting said fitting to clamp it about said bands and cause them to contract about said member, said bands forming a labyrinth packing between the bore and said member.

3. In combination with a fitting having an internal bore and a member having a diameter less than said bore, means for bushing up said member to fit in said bore comprising a plurality of bushings in nested relation initially loosely fitted over said member to approximately fill said bore thereby, each of said bushings comprising a plurality of spaced apart circumferential bands having end connecting bars initially spaced one from the other with an interengaging sealing member, each of said bushings having a notch cut from one side and a button projecting radially from another side, the bushings being reversed end to end alternately to have the button of one extending into the slot of another, and clamp means for contracting said bushings about said member.

EMMET P. GRAY.